United States Patent
Iritani et al.

(10) Patent No.: US 7,009,318 B2
(45) Date of Patent: Mar. 7, 2006

(54) ELECTRIC REFRIGERATION COMPRESSOR HAVING A COOLING SYSTEM FOR AN ELECTRICAL CIRCUIT

(75) Inventors: Kunio Iritani, Anjo (JP); Hiroyuki Kawata, Chiryu (JP); Kenji Funahashi, Nagoya (JP); Yuji Takeo, Toyoake (JP); Yusuke Shindo, Owariasahi (JP); Tsuyoshi Takemoto, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/351,309

(22) Filed: Jan. 27, 2003

(65) Prior Publication Data

US 2003/0143090 A1 Jul. 31, 2003

(30) Foreign Application Priority Data

Jan. 30, 2002 (JP) .............................. 2002-021545
Mar. 7, 2002 (JP) .............................. 2002-062398

(51) Int. Cl.
*H02K 9/00* (2006.01)
(52) U.S. Cl. ............................ 310/58; 310/52; 310/53; 310/64; 310/71; 310/54
(58) Field of Classification Search ................. 310/58, 310/59, 89, 52, 65, 64, 71, 87, 88, 54
See application file for complete search history.

(56) References Cited

U.S. PATENT DOCUMENTS

| | | | | |
|---|---|---|---|---|
| 4,840,222 A | * | 6/1989 | Lakin et al. .................... | 310/64 |
| 4,866,317 A | * | 9/1989 | Katayama ..................... | 310/89 |
| 4,992,687 A | * | 2/1991 | Nel ........................... | 310/68 D |
| 5,073,736 A | * | 12/1991 | Gschwender et al. .......... | 310/88 |
| 5,126,608 A | * | 6/1992 | Sogabe et al. ................. | 310/71 |
| 5,199,898 A | * | 4/1993 | Wisner ......................... | 439/367 |
| 5,331,239 A | * | 7/1994 | Kwun et al. ................... | 310/89 |
| 5,385,453 A | * | 1/1995 | Fogt et al. ................ | 417/410.5 |
| 5,666,015 A | * | 9/1997 | Uchibori et al. .............. | 310/42 |
| 5,763,969 A | * | 6/1998 | Metheny et al. .............. | 310/58 |
| 6,198,183 B1 | * | 3/2001 | Baeumel et al. .............. | 310/64 |
| 6,215,214 B1 | * | 4/2001 | Fisher et al. .................. | 310/89 |
| 6,229,235 B1 | * | 5/2001 | Ellis et al. .................... | 310/89 |
| 6,264,446 B1 | * | 7/2001 | Rajendran et al. ......... | 418/55.6 |
| 6,290,528 B1 | * | 9/2001 | Moore et al. ................ | 439/367 |
| 6,599,104 B1 | * | 7/2003 | Saito et al. ................. | 417/366 |
| 6,619,933 B1 | * | 9/2003 | Ikeda ....................... | 417/410.1 |

FOREIGN PATENT DOCUMENTS

| | | |
|---|---|---|
| JP | U-S58-90385 | 6/1983 |
| JP | 62118728 A * | 5/1987 |
| JP | 06099745 A * | 4/1994 |
| JP | A-2002-5024 | 1/2002 |

* cited by examiner

Primary Examiner—Darren Schuberg
Assistant Examiner—Yahveh Comas
(74) Attorney, Agent, or Firm—Posz Law Group, PLC (57) ABSTRACT

In an electrical compressor having a motor and an electrical circuit integrated with a compression portion, a part of electrical components of the electrical circuit is disposed in spaces between a cylindrical outer surface of a motor housing and an imaginary flat surface that imaginarily contacts the cylindrical outer surface. Therefore, the spaces can be used effectively, and the electrical compressor can be downsized. Further, the part of the electrical components can be effectively cooled by refrigerant in the motor housing. On the other hand, the outer surface of the motor housing is used as one surface defining an inner space of a casing for accommodating the electrical circuit. In this case, the electrical circuit can be effectively cooled by refrigerant in the motor housing.

20 Claims, 9 Drawing Sheets

FIG. 12B
RELATED ART

ELECTRIC REFRIGERATION COMPRESSOR HAVING A COOLING SYSTEM FOR AN ELECTRICAL CIRCUIT

CROSS REFERENCE TO RELATED APPLICATION

This application is based on and incorporates herein by reference Japanese Patent Applications No. 2002-21545 filed on Jan. 30, 2002 and No. 2002-62398 filed on Mar. 7, 2002.

1. Filed of the Invention

The present invention relates to an electrical compressor including a compression portion, a motor and an electrical circuit for driving the motor, which are disposed integrally. The electrical compressor can be suitably used for a vapor-compression refrigerant cycle.

2. Background of the Invention

In an electrical compressor, a compression portion, a motor, and an electrical circuit for the motor are integrated. In the integrated electrical compressor, a casing for accommodating the electrical circuit and a motor housing are integrated. However, because the shapes of the casing and the motor housing are different from each other, an unused space or "dead space" is formed in the motor housing. Therefore, the thickness of the motor housing is greater at the position where the dead space is formed. Thus, the electrical circuit disposed in the casing cannot be effectively cooled by refrigerant flowing in the motor housing. Accordingly, it is necessary to increase the outer surface area of heat-generating components (electrical members) of the electrical circuit, for increasing the heat radiating capacity of the heat-generating components. Alternatively, electrical members having a high heat resistance must be used. As a result, the size of the electrical circuit is increased, and product cost of the electrical compressor is increased.

Figure 12A:
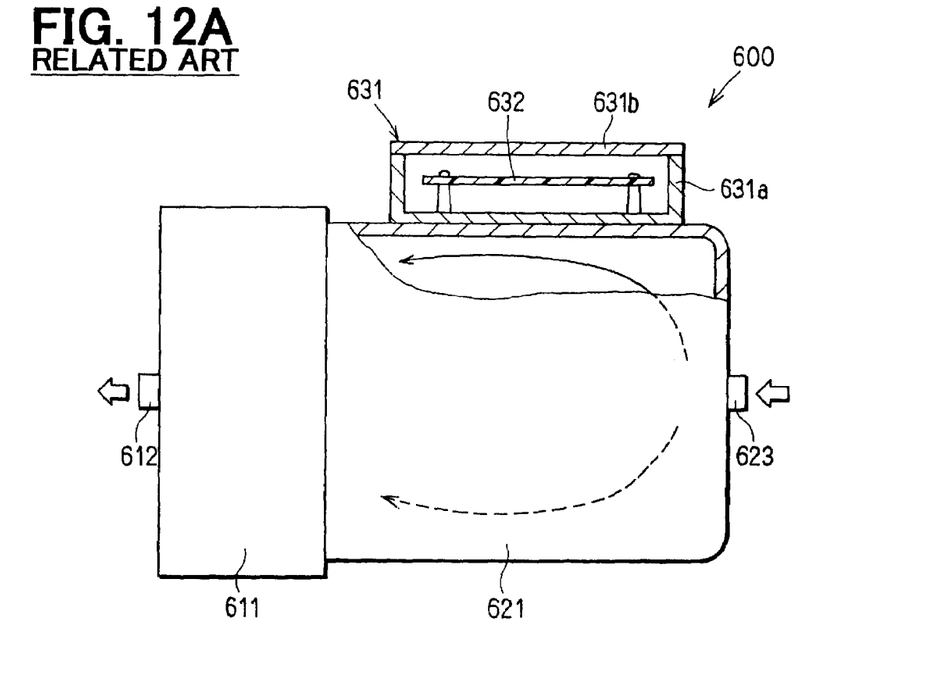
FIGS. 12A and 12B are partial sectional views of an electrical compressor in a related art.
Figure 12B:
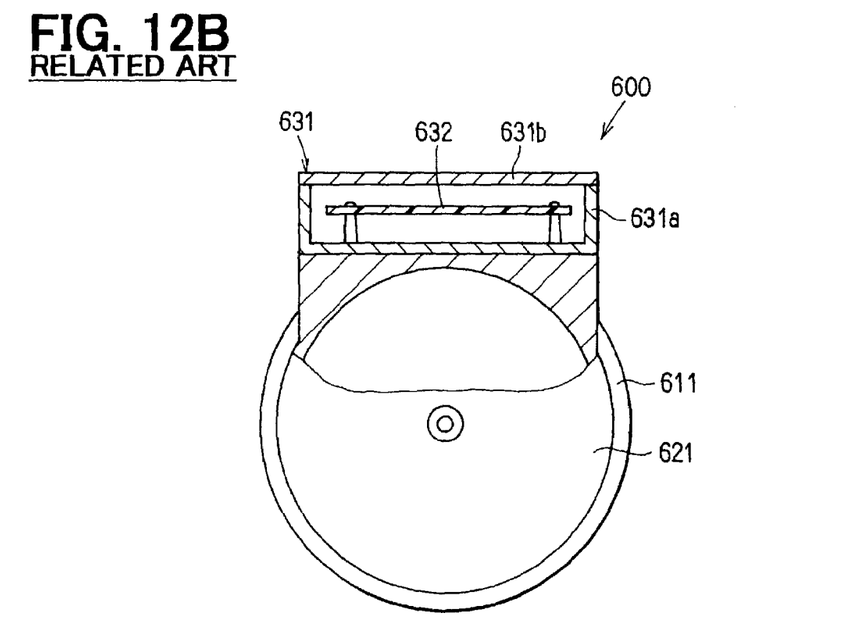

On the other hand, in an electrical compressor shown in FIGS. 12A and 12B, a compressor housing 611 for accommodating a compression mechanism and a cylindrical motor housing 621 for accommodating a motor are integrated to form a housing. Further, a casing 631 composed of a box 631a and a cover 631b is attached to the cylindrical motor housing 621 by a fastening member such as screws. Inside the casing 631, a circuit board 632 with a motor drive circuit is formed. Furthermore, as shown in FIG. 12A, an inlet 623 for introducing refrigerant is formed on the right side of the cylindrical motor housing 621, and an outlet 612 for discharging the compressed refrigerant is formed on the left side of the housing 611. The refrigerant sucked from the inlet 623 flows in the motor housing 621 and cools the motor. However, the circuit board 632 is disposed to be separated from the housing 611, a heat insulation layer exists between the cylindrical motor housing 621 and the circuit board 632, and heat transmission is restricted due to the heat insulation layer. In addition, as shown in FIGS. 12A and 12B, an upper surface of the motor housing 621 is made flat, and a flat bottom surface of the box 631a is connected to the flat portion of the motor housing 621, the thickness of the connection portion between the box 631a and the motor housing 621 is increased. Accordingly, cooling capacity for cooling the circuit board 632 by using the refrigerant in the motor housing 611 is deteriorated.

SUMMARY OF THE INVENTION

In view of the above-described problems, it is an object of the present invention to provide an electrical compressor, which has reduced size and weight.

It is an another object of the present invention to improve cooling performance of an electrical circuit, in an electrical compressor having a compression portion integrated with an electrical motor and the electrical circuit.

According to a first aspect of the present invention, an electrical compressor includes a compression portion for sucking and compressing a refrigerant, an electrical motor that drives the compressor, a housing for accommodating the electrical motor, and an electrical circuit for driving the electrical motor. The housing having a cylindrical outer surface formed into an approximate cylindrical shape, and the electrical circuit is integrated to the cylindrical outer surface of the housing. In the electrical compressor, the electrical circuit includes a plurality of electrical components, and a part of the electrical components is provided in a space between the cylindrical outer surface and an imaginary flat surface that imaginarily contacts the cylindrical outer surface. Accordingly, when the cylindrical outer surface of the housing is connected to a flat surface of a casing for accommodating the electrical circuit, the space between the cylindrical outer surface and the imaginary flat surface can be effectively used. Thus, the size of the electrical compressor can be reduced. Further, because a wall thickness of a connection portion between the housing and the casing can be reduced, the weight of the compressor can be effectively reduced.

Preferably, the part of the electrical components is fixed to the cylindrical outer surface in the space between the cylindrical outer surface and the imaginary flat surface. Therefore, the part of the electrical components can be effectively cooled by the refrigerant in the housing.

Further, the casing has a case member approximately parallel to the imaginary flat surface at a position near the imaginary flat surface, and the case member has a hole through which an inner space of the casing communicates with the space. Therefore, a part of the electrical components can be readily provided in the space between the cylindrical outer surface and the imaginary flat surface.

According to a second aspect of the present invention, an electrical compressor includes a housing for accommodating a compression portion and an electrical motor. The housing defines therein a refrigerant inlet from which the refrigerant is introduced, and a refrigerant passage through which the refrigerant from the refrigerant inlet flows toward the compression portion. In the electrical compressor, the housing has an outer wall surface that is used as a one surface for defining an inner space of a casing, and the electrical circuit is disposed in the space of the casing to perform a heat exchange with the refrigerant flowing through the refrigerant passage in the housing. Therefore, the electrical circuit can be effectively heat-exchanged with the refrigerant in the housing through the one surface. That is, because a heat-insulation layer is not formed between the electrical circuit and the refrigerant in the housing, the electrical circuit in the casing can be effectively cooled by the refrigerant in the housing.

Preferably, the casing is positioned above the housing, and the one surface is a bottom surface of the casing. Therefore, electrical circuit can be readily positioned on the outer surface of the housing. Further, the electrical circuit includes a heat-generating component that generates heat when being operated, and the heat-generating component contacts the one surface of the casing. Therefore, the heat-generating component can be effectively cooled. In addition, a thermal-conductive member can be disposed between the heat-generating component and the one surface of the casing. In this case, heat from the heat-generating component can be effectively transmitted to the refrigerant in the housing.

Preferably, the electrical circuit includes a plurality of circuit boards attached to the outer wall surface of the housing. Therefore, the circuit boards can be readily attached to the outer wall surface of the housing in accordance with the shape of the outer wall surface.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

[First Embodiment]

Figure 1:
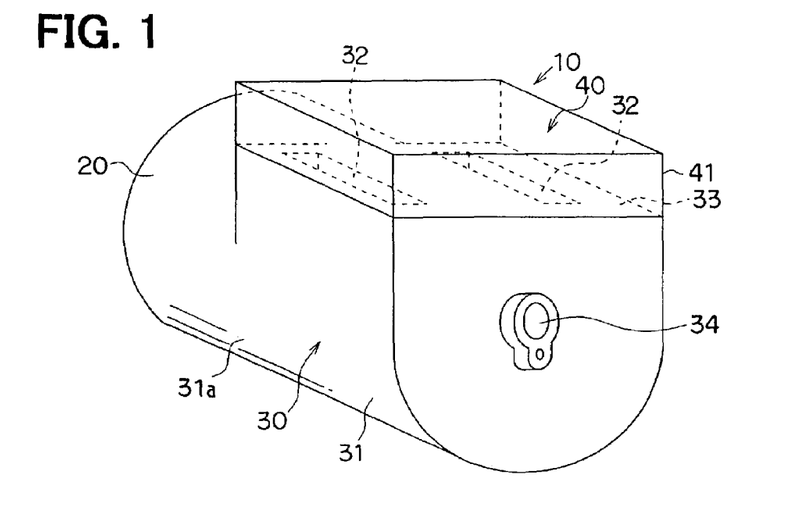
FIG. 1 is a perspective view of an electrical compressor according to a first embodiment of the present invention.

In this embodiment, the present invention is typically applied to an electrical compressor of a vapor-compression refrigerant cycle for a vehicle air conditioner. As shown in FIG. 1, an electrical compressor 10 includes a scroll type compression mechanism 20 (compression portion) for sucking and compressing refrigerant, a DC brushless electrical motor 30 for driving the compression mechanism 20, and an electrical circuit 40 composed of an inverter circuit for driving the motor 30. The compression mechanism 20 and the motor 30 are generally attached to the same shaft on the same line.

The compression mechanism 20 and the motor 30 are disposed in a motor housing 31 having an approximate cylindrical shape, and the electrical circuit 40 is disposed in a casing 41. The casing 41 is attached to a cylindrical outer surface 31a of the motor housing 31 by using a fastening member such as bolts, so that the electrical circuit 40 is integrated to the compression mechanism 20 and the motor 30. In the first embodiment, cases such as the motor housing 31 and the casing 41 are made of an alloy of aluminum. The electrical compressor 10 is fixed to a crank case of a vehicle engine so that the electrical circuit 40 is positioned opposite to the vehicle engine relative to the motor 30. In this embodiment, the electrical compressor 10 is attached to the crank case. However, when the electrical compressor 10 is used for an electrical vehicle and a hybrid vehicle which are driven by an electrical motor, the electrical compressor 10 can be attached to a vehicle body.

Figure 3:
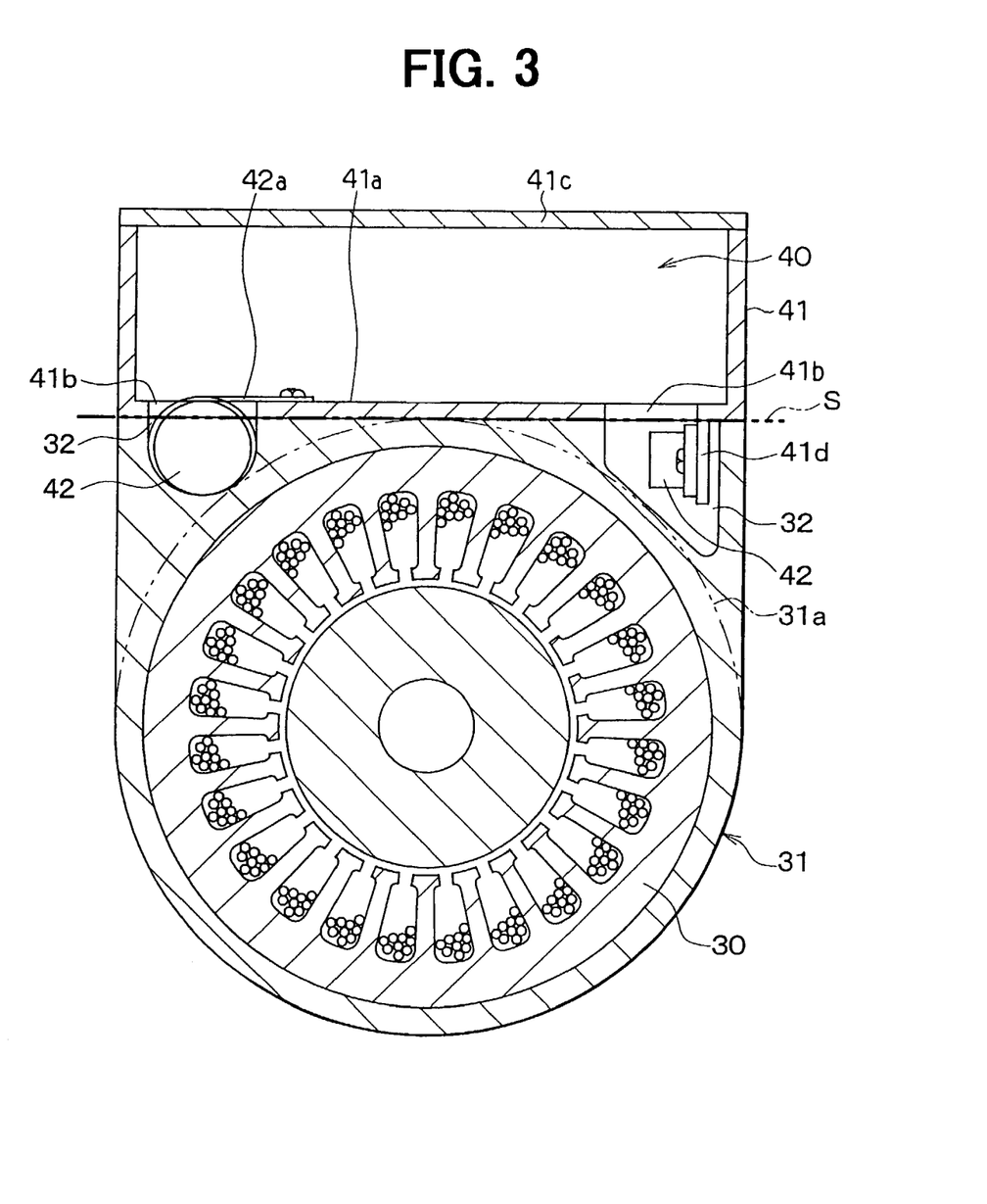
FIG. 3 is a sectional view taken along line III—III in FIG. 2 according to the first embodiment.
Figure 4:
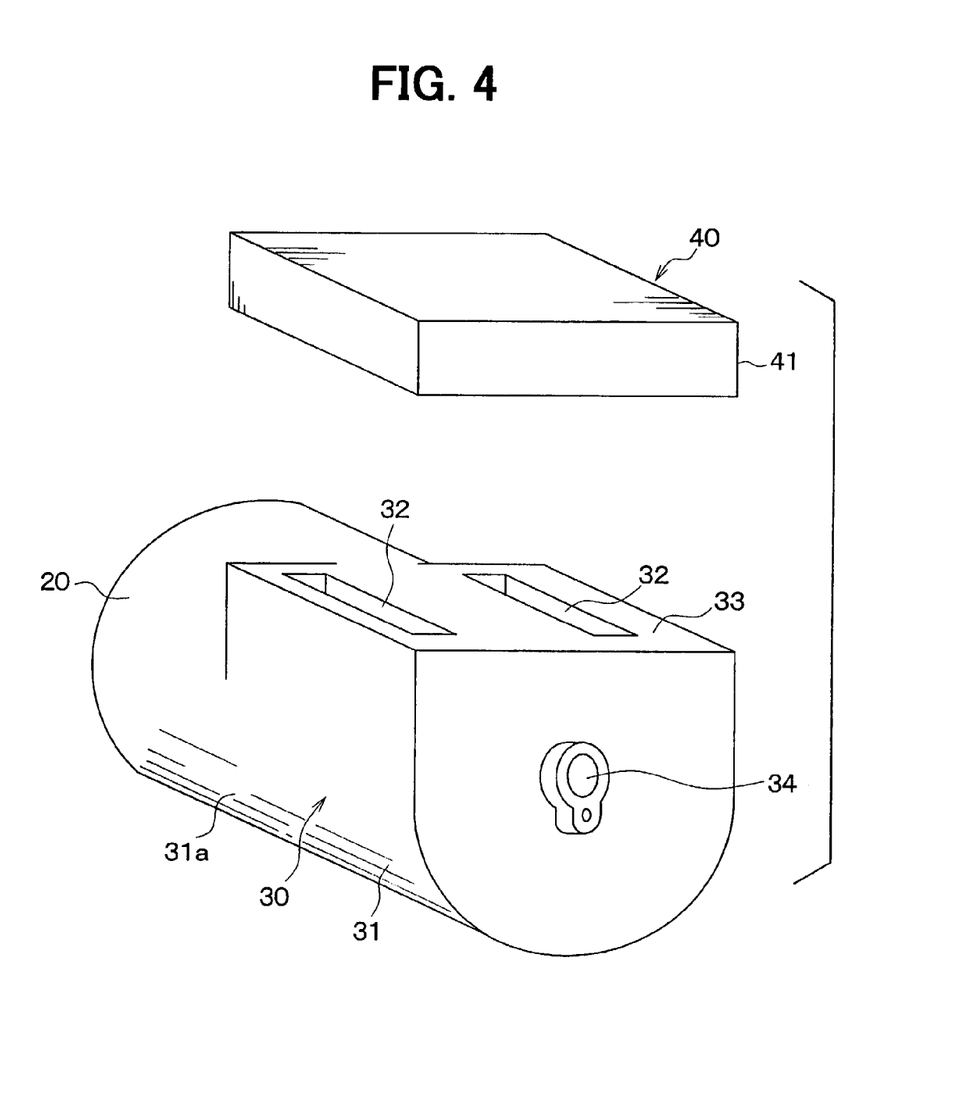
FIG. 4 is an exploded perspective view of the electrical compressor according to the first embodiment.

As shown in FIG. 3, an imaginary flat surface S (or a tangential plane S) where the casing 41 contacts the cylindrical outer surface 31a is defined. Further, as shown in FIGS. 3 and 4, two spaces 32 are formed between the cylindrical outer surface 31a and the imaginary flat surface 5, and a part of the electrical circuit 40 is disposed in the spaces 32. In the first embodiment, the two spaces 32 are formed approximately symmetrically when being viewed from the axial direction of the motor housing 31.

In this embodiment, electrical parts 42, which generate much heat such as an IGBT, a MOS-FET and an electrolytic capacitor of aluminum, are disposed in the spaces 32, among the electrical circuit 40. Therefore, as shown in FIG. 3, the electrical parts 42 can be disposed approximately symmetrically when being viewed from the axis direction of the cylindrical motor housing 31. That is, the electrical parts 40 can be disposed right-left symmetrically in FIG. 3.

As shown in FIG. 1, the casing 41 is positioned opposite to the motor housing 31, relative to the imaginary flat surface S, and is fixed in a seat surface 33 of the motor housing 31. The seat surface 33 is parallel to the imaginary flat surface 33. The casing 41 has a flat bottom plate 41a that contacts the seat surface 33 on the imaginary flat surface S. Holes 41b are provided in the bottom plate 41a so that an inner space of the casing 41 communicates with the spaces 32 through the holes 41b.

Figure 2:
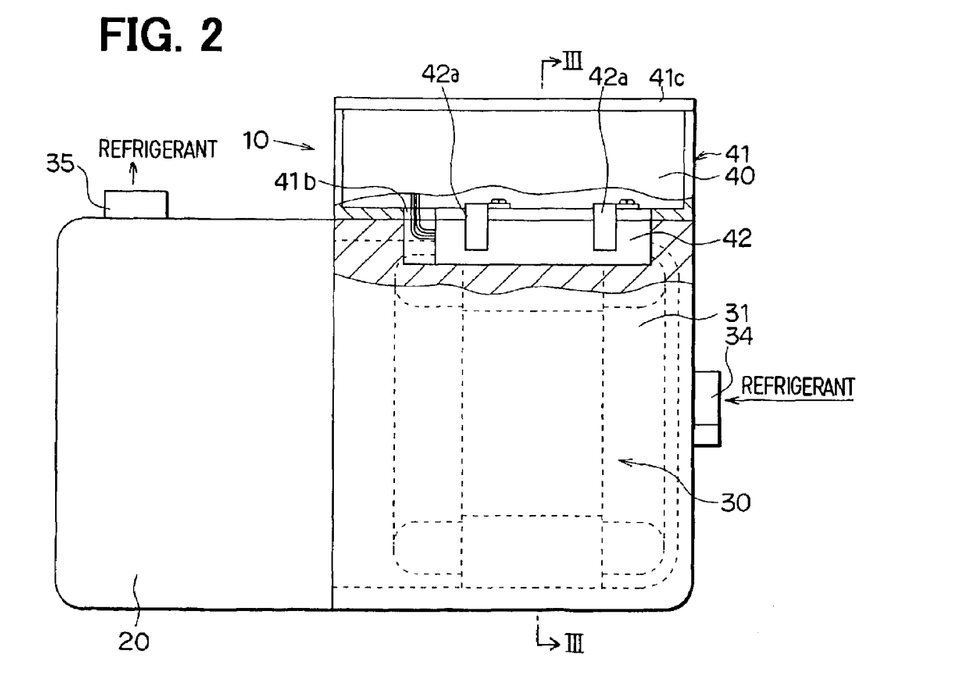
FIG. 2 is a partial sectional view of the electrical compressor according to the first embodiment.

As shown in FIGS. 2 and 3, the electrical parts 42 are fixed to the bottom plate 41a or to an attachment portion 41d formed integrally with the bottom plate 41a so that the electrical parts 42 can be hung in the casing 41 through a bracket 42a.

When the casing 41 is fixed to the motor housing 31, the bottom plate 41a is placed on the seat surface 33 so that the electrical parts 42 can be inserted into the spaces 32. Thereafter, the bottom plate 41a is fixed to the seat surface 33 by using bolts or screws. A gasket used as a seal member can be disposed between the bottom plate 41a and the seat surface 33 so that a gas leakage between the bottom plate 41a of the casing 40 and the seat surface 33 of the motor housing 31 can be prevented.

After the bottom plate 41a is fixed to the seat surface 33, an insulation gel with high-thermal conductivity is filled in the groove 32, so that the heat generated by the electrical parts 42 disposed in the spaces 32 can be sufficiently transferred. Further, the casing cover 41c is attached to the casing 41 through a seal member such as a packing and a gasket.

In this embodiment, when the electrical parts 42 disposed in the spaces 32 are capacitors, the capacitors are covered by electrical insulation films that have a high-thermal conductivity, and are fixed to the brackets 42a. When the electrical parts 42 disposed in the spaces 32 are power elements such as an IGBT and a MOS-FET, a heat sink on which the power elements are bonded is fixed to the attachment portion by screws, and the electrical insulation gel with a high-thermal conductivity is filled in the spaces 32.

As shown in FIG. 2, an inlet port 34 for introducing a refrigerant is formed at the end of the motor housing 31 to be opposite to the compression mechanism 20. The compression mechanism 20 sucks the refrigerant from the inlet port 34 of the motor housing 31 and discharges the compressed refrigerant from a discharge port 35.

Figure 9:
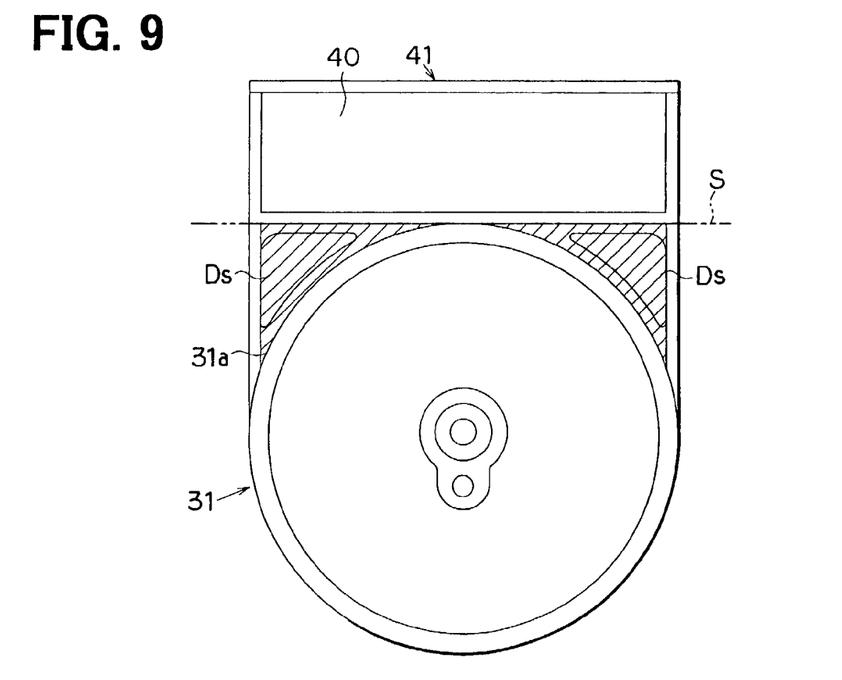
FIG. 9 is a schematic diagram showing an electrical compressor in a comparison example.

According to the first embodiment, the electrical parts 42 are disposed in the spaces formed between the imaginary flat surface S and the cylindrical outer surface 31a. Accordingly, compared with the example shown in FIG. 9, where the unused dead spaces Ds are formed between the cylindrical outer surface 31a and the imaginary flat surface, the weight and the size of the electrical compressor 10 can be reduced. Moreover, since the dead spaces Ds are effectively used and the wall thickness of the motor housing 31 can be made smaller, the electrical parts 42 can be reliably cooled by the refrigerant flowing in the motor housing 31. Therefore, it is unnecessary to increase the size of the electrical parts 42 in order to increase the heat-radiation performance of the electrical parts 42, and it is unnecessary to use heatproof electrical parts 42. Consequently, downsizing and reducing the manufacturing cost of the electrical circuit 40 can be realized, and the reliability and the endurance of the electrical circuit 40 can be enhanced.

According to the first embodiment, the electrical parts 42 such as the power elements with a large heat-generation amount can be arranged in the spaces 32 to be opposite to each other, and a wiring board such as a printed board can be arranged near the motor housing 31. Alternatively, the wiring board can be fixed to the attachment portion 41d through an electrical insulation film. Therefore, the wiring board connected to the electrical parts 42 can be effectively cooled. In this case, a wiring conductive body in the wiring board can be made thinner, and the size of the wiring board can be reduced. Accordingly, the electrical compressor 10 can be effectively downsized.

[Second Embodiment]

In the above-described first embodiment, the electrical parts 42 are fixed to the casing 41. However, in the second embodiment, as shown in FIGS. 5–8, the electrical parts 42 are disposed in the space 32 formed between the imaginary flat surface S and the cylindrical outer surface 31a, and the electrical parts 42 are fixed to the cylindrical outer surface 31a of the motor housing 31. Moreover, the positions of the cylindrical outer surface 31a, where the electrical parts 42 are fixed, are formed into a flat shape so that electrical parts 42 can be stably fixed to the cylindrical outer surface 31a. In the second embodiment, the insulating gel that has a high thermal conductivity is filled around the electrical parts 42, so that heat radiation performance of the electrical parts 42 is improved.

Figure 5:
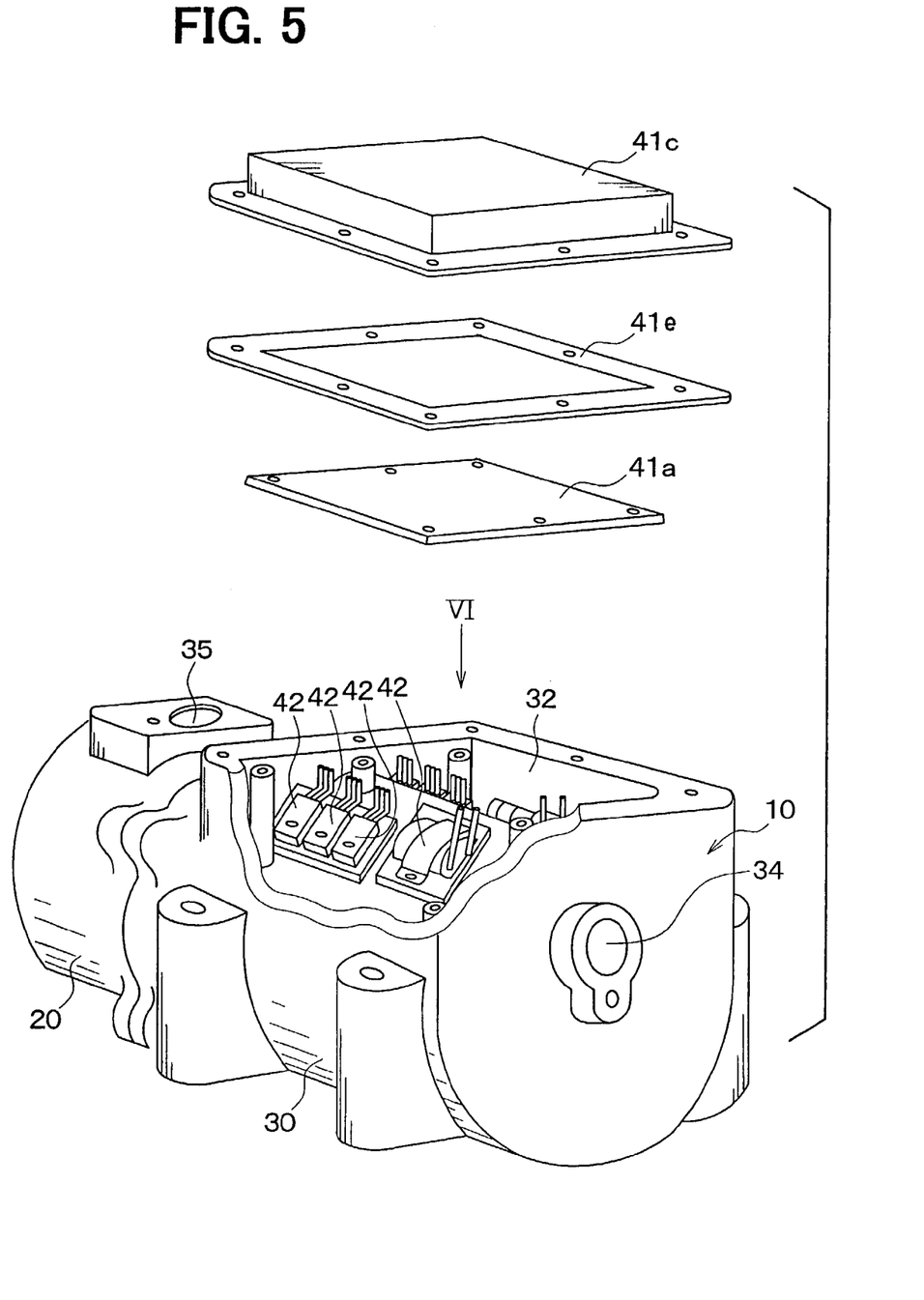
FIG. 5 is an exploded perspective view of an electrical compressor according to a second embodiment of the present invention.
Figure 6:
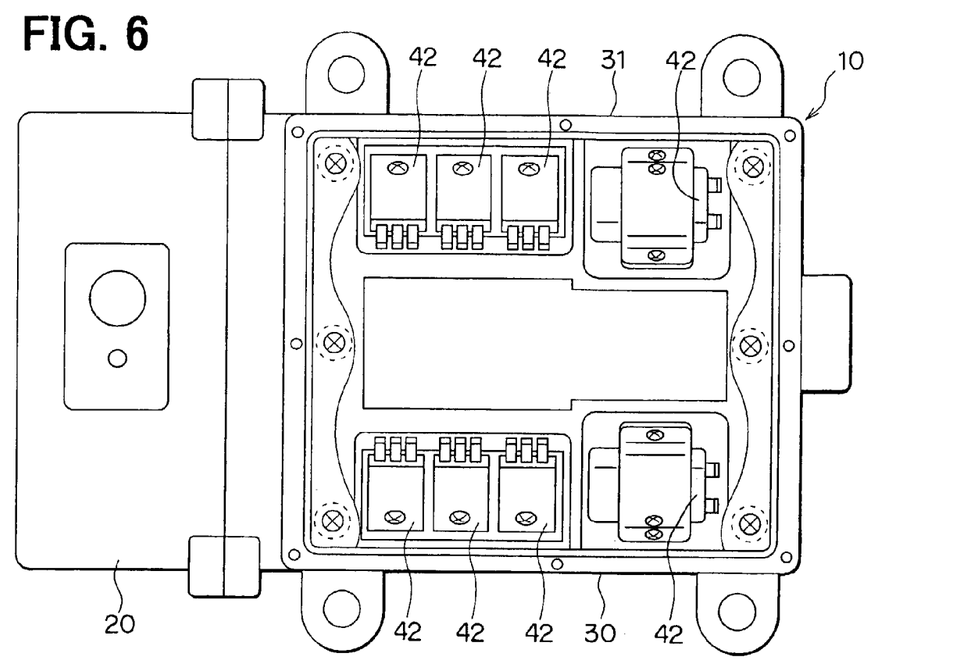
FIG. 6 is a side view when being viewed from the arrow VI in FIG. 5.

As shown in FIG. 5, in the second embodiment, the bottom plate 41a is used as a wiring board, and the casing cover 41c and the bottom plate 41a are fixed to the motor housing 31 by using a fastening member such as bolts and screws. In the second embodiment, a packing member 41e is disposed between the bottom plate 41a and the case cover 41c while the bottom plate 41a and the case cover 41c are fixed to the motor housing 31. FIG. 6 is a side view when being viewed from the arrow VI in FIG. 5.

Figure 7:
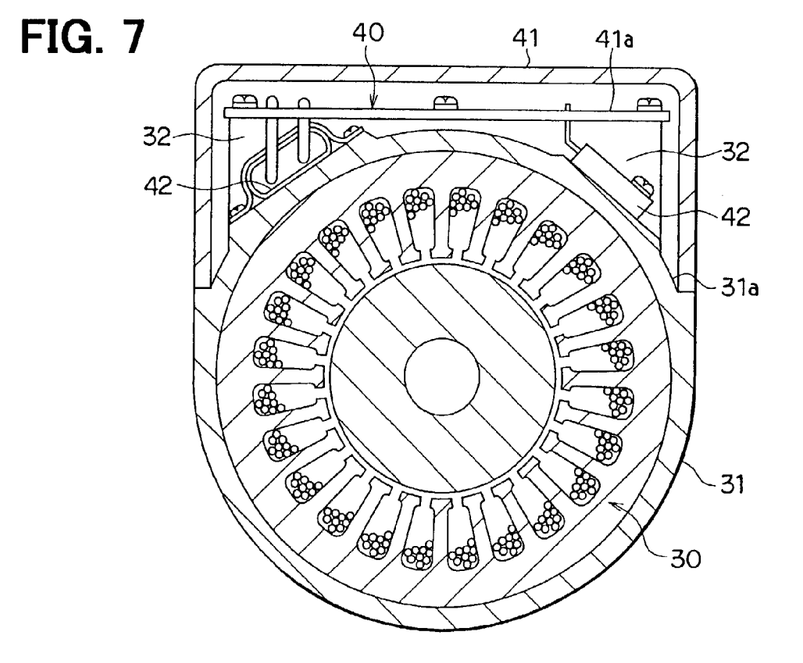
FIG. 7 is a sectional view corresponding to FIG. 3, showing an electrical compressor according to the second embodiment.
Figure 8:
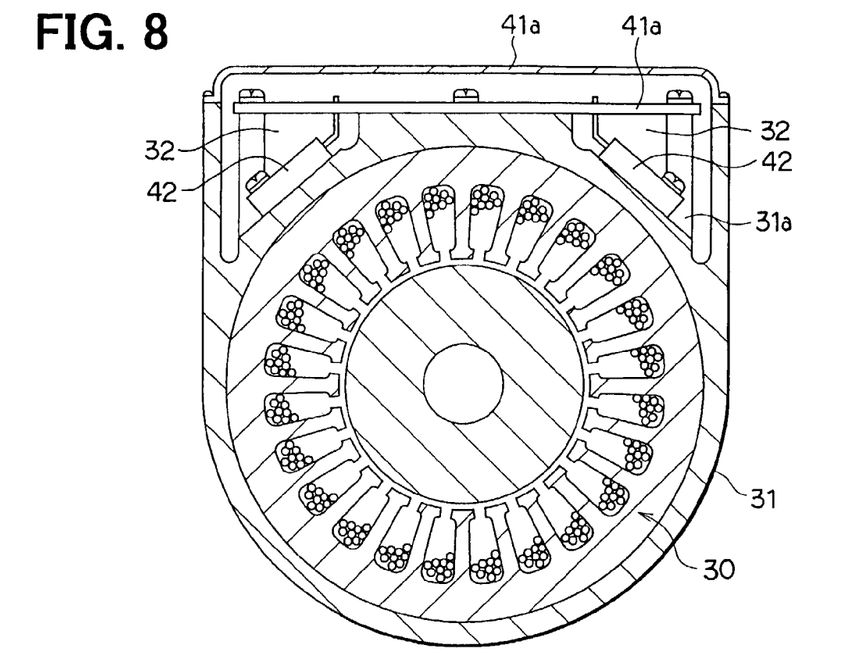
FIG. 8 is a sectional view corresponding to FIG. 3, showing an electrical compressor according to the second embodiment.

The electrical parts 42 disposed in the spaces 32 can be suitably changed. For example, in FIG. 7, the left electrical part 42 is an electrolytic capacitor of aluminum. In this case, the surface of the electrical part 42 is covered by an electrical insulating film and the electrical part 42 is fixed to the outer surface 31a. On the other hand, the right electrical part 42 in FIG. 7 is a power element. In this case, the electrical part 42 is fixed on the outer surface 31a through a heat sink in which the power element is bonded generally. Further, in FIG. 8, both the electrical parts 42 disposed in the right and left spaces 32 are the power elements. As described above, the electrical parts 42 disposed in the spaces 32 can be suitably changed in accordance with a necessity.

According to the second embodiment, the electrical parts 42 are fixed to the cylindrical outer surface 31a of the motor housing 31, the heat of the electrical parts 42 can be readily conducted to the sucked refrigerant in the motor housing 31, and the electrical parts 42 can be effectively cooled.

Moreover, in this embodiment, since the bottom plate 41a used as the wiring board is also fixed in the motor housing 31, the wiring board connected to the electrical parts 42, in which high electrical current passes, can be effectively cooled. Therefore, heat radiating performance of the wiring board is improved, and the wiring board can be effectively downsized.

[Third Embodiment]

Figure 10:
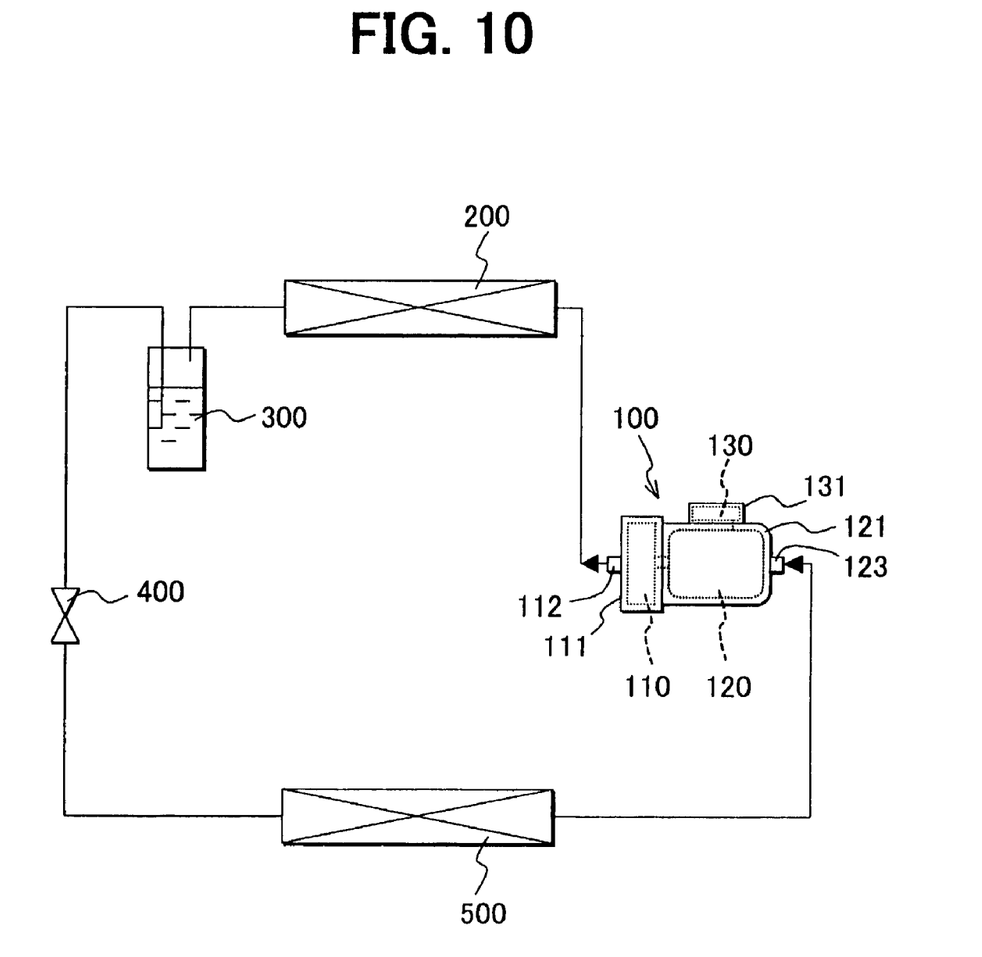
FIG. 10 is a schematic diagram of a vapor-compression refrigerant cycle with an electrical compressor according to a third embodiment of the present invention.

The third embodiment of the present invention will be now described with reference to FIGS. 10, 11A and 11B. FIG. 10 shows a vapor-compression refrigerant cycle in which an electrical compressor 100 of the third embodiment is typically used. The refrigerant cycle includes the electrical compressor 100 for compressing refrigerant, and a radiator 200 that cools the refrigerant discharged from the compressor 100. Refrigerant from the radiator 200 flows into a receiver 300 to be separated into gas refrigerant and liquid refrigerant in the receiver 200. Liquid refrigerant separated in the receiver 200 flows into an expansion valve 400 to be decompressed in the expansion valve 400. Low-pressure refrigerant decompressed in the expansion valve 400 flows into an evaporator 500, and is evaporated in the evaporator 500 by absorbing heat from air. Therefore, air passing through the evaporator 500 is cooled. In the third embodiment, the expansion valve 400 is used as a decompression unit. However, as the decompression unit, a fixed throttle can be used.

Next, the structure of the compressor 100 according to the third embodiment will be described. As shown in FIG. 10, the compressor 100 includes a compression mechanism 110 (e.g., a scroll type compression mechanism, in this embodiment) for sucking and compressing the refrigerant, an electrical motor 120 (e.g., a brushless DC motor in this embodiment) for driving the compression mechanism 110, and an inverter circuit 130 that is an electrical circuit for driving the motor 120.

The compression mechanism 110 is disposed in a housing 111 made of an alloy of aluminum. A cylindrical motor housing 121 is made of an alloy of aluminum and receives the motor 120. The housing 111 of the compression mechanism 110 and the motor housing 121 are integrated to construct an integrated housing.

An inlet 123, which is coupled to a refrigerant outlet of the evaporator 500, is formed in the cylindrical motor housing 121. An outlet 112, which is coupled to a refrigerant inlet of the radiator 200, is formed in the housing 111. The scroll compression mechanism 110 changes a volume of an operation chamber by turning a movable scroll against a fixed scroll, so that the refrigerant is sucked and compressed. The fixed scroll can be constructed with a part of the housing 111.

Figure 11A:
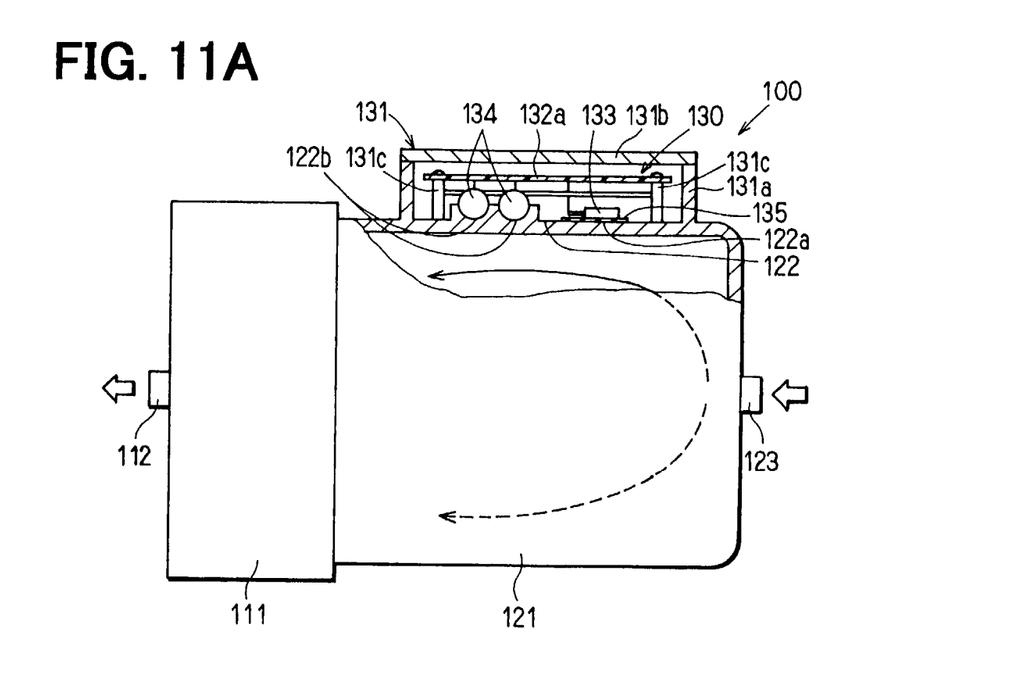
FIGS. 11A and 11B are partial sectional views of the electrical compressor according to the third embodiment.
Figure 11B:
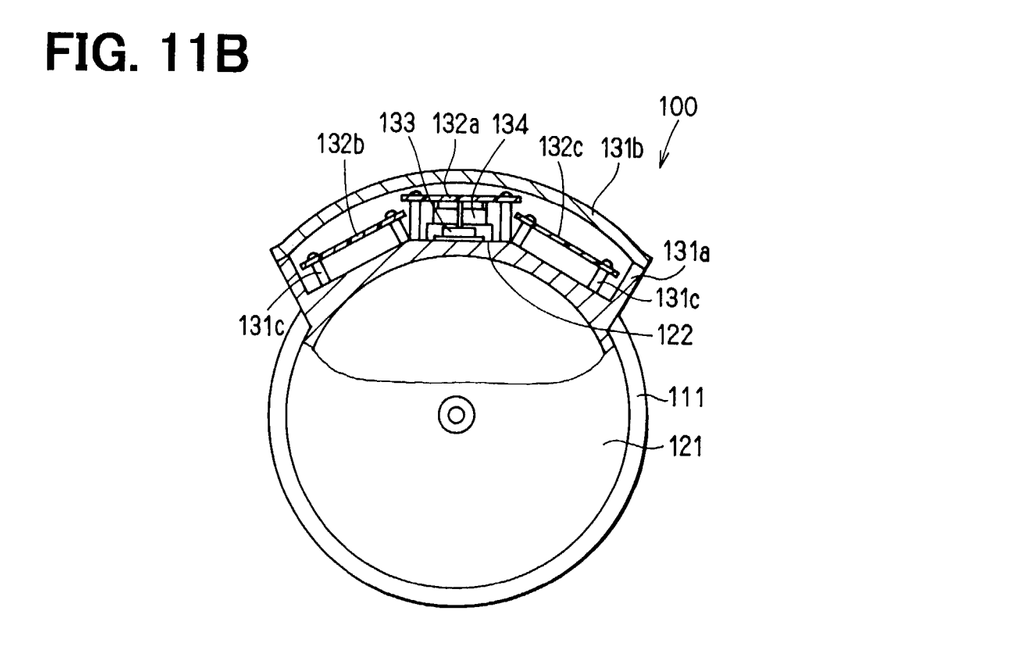

As shown in FIGS. 11A and 11B, a casing 131 composed of a box 131a and a cover 131b is disposed on the motor housing 121 above the motor housing 121. Inside the casing 131, the inverter circuit 130 is disposed.

The inverter circuit 130 is composed of three circuit boards 132a, 132b, 132c, electrical components installed on the circuit boards 132a, 132b, 132c and the like. Among the components installed in the three circuit boards 132a, 132b, 132c, only a power transistor 133 and a capacitor 134, which are the heat-generating components in this embodiment, are shown in FIGS. 11A and 11B.

As shown in FIG. 11B, the box 131a is integrally molded with the motor housing 121. Therefore, a bottom surface 122 inside the box 131a is used as an outer surface of the motor housing 121. Plural support members 131c are provided on the bottom surface 122 of the box 131a, and the circuit boards 132a, 132b, and 132c are attached to the support members 131x by using screws.

As shown in FIG. 11A, terminals of the power transistor 133 and the capacitor 134 are connected to the circuit boards 132a. The power transistor 133 and the capacitor 134 are installed to contact the bottom surface 122 of the box 132a. The power transistor 133 contacts the bottom surface 122 on a contact portion 122a. The contact portion 122a is formed flatly in accordance with the shape of the bottom surface of the power transistor 133. Between the contact portion 122a of the bottom surface 122 and the power transistor 133, a thermal conductive sheet 135 is placed. Therefore, the power transistor 133 contacts the contact portion 122a through the thermal conductive sheet 135.

The thermal conductive sheet 135 having a high heat conductivity is a silicon rubber sheet filled with an inorganic filler without having an electrical conductivity. Therefore, the thermal conductive sheet 135 is used as an electrical insulation member for electrically insulating a conductive part of the power transistor 133 from the bottom surface 122.

The capacitor 134 contacts a contact portion 122b of the bottom surface 122. The contact portion 122b has a groove shape corresponding to the lower surface of the capacitor 134. The capacitor 134 directly contacts the contact portion 122b, in FIGS. 11A and 11B. However, a heat-conductive sheet can be placed between the capacitor 134 and the contact portion 122b.

The box 131a and the cover 131b are bonded to each other by using an adhesive, so that the casing 131 in this embodiment has a sealed structure. A seal member can be placed between the box 131a and the cover 131b. In this case, the box 131a and the cover 131b can be air-tightly connected by a fastening member such as screws, through the seal member.

In FIGS. 11A and 11B, the structures of the motor 120 and feeding terminals for the motor 120 are omitted. When the motor 120 of the electrical compressor 100 is driven by an electrical power supplied from the inverter circuit 130, the motor 120 drives the compression mechanism 110 connected to the motor 120, so that refrigerant is sucked to the compression mechanism 110. Therefore, low-temperature gas refrigerant flows from the inlet 123, and cools the motor 120 while flowing in the motor housing 121. Thereafter, the refrigerant is sucked to the compression mechanism 110, and is compressed by the compression mechanism 110. Therefore, high-temperature high-pressure gas refrigerant is discharged from the outlet 112 of the compressor 100.

A part of refrigerant flowing from the inlet 123 toward the compression mechanism 110 flows through the upper part within the motor housing 121. The refrigerant cools the inverter circuit 130 by absorbing heat from the inverter circuit 130 through the bottom surface 122. Here, the heat from the inverter circuit 130 is mainly the heat from the power transistor 133 and the capacitor 134. Therefore, the inverter circuit 130 including the power transistor 133 and the capacitor 134 can be effectively cooled by the refrigerant sucked from the inlet 123 into the motor housing 121.

In the third embodiment, the box 131a of the casing 131 accommodating the inverter circuit 130 is integrated to the motor housing 121, and the outer surface of the motor housing 121 is used as the bottom surface 122 of the casing 131. Therefore, a heat insulation layer is not formed between the casing 131 and the motor housing 121. Accordingly, the sucked refrigerant flows in the motor housing 121 at a position near the inverter circuit 130.

Furthermore, the power transistor 133 and the capacitor 134, which are heat-generating components, contact the contact portions 122a, 122b of the bottom surface 122, and the contact portions 122a and 122b are formed to correspond to the shapes of the power transistor 133 and the capacitor 134. Therefore, contact areas between the contact portions 122a, 122b and the power transistor 133 and the capacitor 134 can be made larger, and cooling performance of the inverter circuit 130 including the power transistor 133 and the capacitor 134 can be improved.

The power transistor 133 contacts the contact portion 122a of the bottom surface 122 in the casing 131, through the thermal conductive sheet 135. Therefore, heat-radiating from the power transistor 133 is performed smoothly, and an electrical conductive part of the power transistor 133 can be insulated relative to the casing 131.

Furthermore, the box 131a of the casing 131 is formed integrally with the motor housing 121, and the outer surface of the motor housing 121 is used as the bottom surface 122 of the casing 131. That is, a part of the motor housing 121 is used as the bottom part of the casing 131. Therefore, the compressor 100 can be downsized, and the common using structure between the casing 131 and the motor housing 121 can be made simple.

Furthermore, the inverter circuit 130 includes the plural circuit boards 132a, 132b and 132c (e.g., three, in this embodiment). In that case, the inverter circuit 130 can be readily arranged to more correspond to the shape of the motor housing 121, as compared with a case where only a single circuit board is provided. Therefore, the compressor 100 can be effectively downsized.

According to the third embodiment, the cooling performance of the inverter circuit 130 including the heat-generating components such as the power transistor 133 and the capacitor 134 can be effectively improved. Therefore, it is unnecessary to use components having a high heat resistance. Thus, the compressor 100 can be downsized because the components without having the high heat resistance can be used.

Furthermore, in the third embodiment, even when the casing 131 of the inverter circuit 130 is provided on the outer surface of the housing 111 at a refrigerant suction side, the inverter circuit 130 can be cooled by the sucked refrigerant. In the above-described third embodiment, the casing 131 is formed on the top surface of the motor housing 121. However, the casing 131 can be formed on the bottom surface of the motor housing 111 at a position near the inlet 123. The box 131a of the casing 131 can be integrated to the motor housing 121 after the box 131a and the motor housing 121 are separately formed. Alternatively, an integrated body of the box 131a and the motor housing 121 can be formed by cutting-processing. The space of the casing 131 may be treated in potting for insulating and water resistance.

The contact portions 122a and 122b are formed in accordance with the shapes of the lower surfaces of the heat-generating components in the third embodiment. However, the contact portions 122a, 122b can be provided at the other positions. For example, the top surfaces of the heat-generating components can contact the contact portions 122a, 122b. Further, the heat-generating components except for the power transistor 133 and the capacitor 134 can contact the bottom surface 122.

In the third embodiment, the thermal-conductive sheet 135 having the heat conductivity is used as the electrical insulation member. However, silicon gel can be used instead of the thermal-conductive sheet 135. Further, when the electrical insulation function is unnecessary in the thermal-conductive sheet, a sheet having an electrical conductivity filler may be used.

Although the present invention has been fully described in connection with the preferred embodiments thereof with reference to the accompanying drawings, it is to be noted that various changes and modifications will become apparent to those skilled in the art.

For example, in the above-described embodiments, the present invention is typically applied to the electrical compressor 10, 100 having the scroll compression mechanism 20, 110. However, the present invention can be applied to the other type compressor such as a vane compressor, a rotary compressor, a piston compressor and a displacement variable compressor. Further, the positions of the refrigerant inlet and outlet in the housing of the compressor can be changed. In addition, as the motor 30, 120, the other AC motor may be used instead of the brushless DC motor. Further, as the drive circuit, a chopper type may be used.

Further, the compressor of the present invention can be used for a refrigerant cycle for the other use.

Such changes and modifications are to be understood as being within the scope of the present invention as defined by the appended claims.

What is claimed is:

1. An electrical compressor for a refrigeration circuit comprising:
   a compression portion, which draws and compresses refrigerant circulating in the refrigeration circuit;
   an electrical motor that drives the compression portion;
   a housing for accommodating the electrical motor, the housing having a cylindrical outer surface formed into an approximate cylindrical shape; and
   an electrical circuit for driving the electrical motor, the electrical circuit being integrated to the cylindrical outer surface of the housing, wherein:
   the housing includes a refrigerant passage through which the refrigerant passes, such that the refrigerant passes through the electrical motor when being drawn by the compression portion;
   the electrical circuit includes a plurality of electrical members; and
   the electrical members are located in a space between the cylindrical outer surface and a tangential plane, which is tangential to the cylindrical outer surface, and the electrical members are located in the vicinity of a line where the tangential plane meets the cylindrical outer surface.

2. The electrical compressor according to claim 1, wherein the electrical members are fixed to the cylindrical outer surface in the space.

3. The electrical compressor according to claim 1, wherein the plurality of electrical members is a first plurality of electrical members, and the electrical compressor further comprises:
   a casing for accommodating a second plurality of electrical members of the electrical circuit, wherein:
   the casing has a case member approximately parallel to the tangential plans at a position near the tangential plane; and
   the case member has a hole through which an inner space of the casing, opposed to the housing, communicates with the space.

4. The electrical compressor according to claim 3, wherein
   the case member contacts the cylindrical outer surface approximately in parallel with the tangential plane.

5. The electrical compressor according to claim 1, wherein:
   the space is a first space, and a second space, which is similar to the first space, is provided on an opposite side of the line where the tangential plane meets the cylindrical outer surface, and the second space is approximately symmetrical with the first space; and
   the plurality of electrical members is a first plurality of electrical members, and a second plurality of electrical members of the electrical circuit is located in the second space.

6. The electrical compressor according to claim 1, wherein:
   the housing includes a refrigerant inlet from which the refrigerant is introduced; and
   the compression portion is disposed to draw the refrigerant from the housing.

7. The electrical compressor according to claim 1, wherein the electrical members includes at least one of an IGBT, a MOS-FET and a condenser.

8. The electrical compressor according to claim 1, wherein the housing accommodates the compression portion and the electrical motor.

9. An electrical compressor for a refrigeration circuit comprising:
   a compression portion, which draws and compresses refrigerant circulating in the refrigeration circuit;
   an electrical motor that drives the compression portion;
   a housing for accommodating the electrical motor, wherein the housing includes:
   a cylindrical outer surface;
   a planar seat surface for receiving a casing, which is attached to the housing; and
   a refrigerant passage through which the refrigerant passes, such that the refrigerant passes through and cools the electrical motor when being drawn by the compression portion; and
   an electrical circuit for driving the electrical motor, wherein the electrical circuit includes a plurality of electrical members, wherein a space is formed between the cylindrical outer surface and a plane defined by the planar seat surface, and the electrical members occupy the space and are located in close proximity to the cylindrical outer surface such that heat generated by the electrical members is transferred to the refrigerant passing through the motor, wherein:
   the plane is a first plane, and a second plane includes the axis of the motor and is perpendicular to the first plane;

the space is a first space, and a second space, which is located between the outer cylindrical surface and the first plane, is provided on an opposite side of the second plane; and the plurality of electrical members is a first plurality of electrical members, and a second plurality of electrical members of the electrical circuit occupies the second space, such that heat generated by to second plurality of electrical members is transferred to the refrigerant passing through the motor.

10. The electrical compressor according to claim 9, wherein:
the housing has an outer wall surface that is one of several surfaces that define an inner space of the casing; and
the casing is positioned above the housing, and the outer wall surface is a bottom surface of the casing.

11. The electrical compressor according to claim 9, wherein:
the housing has an outer surface that is one of several surfaces that define an inner space of the casing:
the housing includes a first housing portion for accommodating the compression portion, and a second housing portion for accommodating the motor; and
the outer wall surface is on the second housing portion.

12. The electrical compressor according to claim 9, wherein:
the housing has an outer wall surface that is one of several surfaces that define an inner space of the casing:
the electrical circuit includes a heat-generating component that generates heat when being operated; and
the heat-generating component contacts the outer wall surface.

13. The electrical compressor according to claim 12, wherein the outer wall surface has a shape corresponding to a shape of the heat-generating component.

14. The electrical compressor according to claim 12, further comprising a thermal-conductive member disposed between the heat-generating component and the outer wall surface.

15. The electrical compressor according to claim 12, further comprising an electrical insulator disposed between the heat-generating component and the outer wall surface, for electrically insulating the heat-generating component from the outer wall surface.

16. The electrical compressor according to claim 9, wherein the electrical circuit includes a plurality of circuit boards attached to the outer wall surface of the housing.

17. The electrical compressor according to claim 9, wherein:
the housing has an outer wall surface that is one of several surfaces that define an inner space of the casing; and
a part of the casing that includes at least the outer wall surface is integrally molded with the housing.

18. The electrical compressor according to claim 9, wherein the outside of the housing is U-shaped, and the space is located between a wall forming a leg of the U-shape and the outer cylindrical surface.

19. An electrical compressor for a refrigeration circuit comprising:
a compression portion, which draws and compresses refrigerant circulating in the refrigeration circuit;
an electrical motor that drives the compression portion;
a housing for accommodating the compression portion and the electrical motor, wherein the housing includes a refrigerant inlet into which the refrigerant is introduced, and a refrigerant passage, through which the refrigerant from the refrigerant inlet flows toward the compression portion, wherein the refrigerant passage conducts the refrigerant through the electrical motor towards the compression portion;
an electrical circuit for driving the electrical motor;
a casing for accommodating the electrical circuit, wherein:
the housing has an outer cylindrical wall that defines an inner space of the casing, wherein the housing and the casing form a U-shape, and the inner space is formed between opposed legs of the U-shape; and
the electrical circuit is located in the inner space of the casing in close proximity to the outer cylindrical wall such that heat generated by the electrical circuit is transferred to the outer cylindrical wall and to the refrigerant flowing through the refrigerant passage in the housing.

20. The electrical compressor according to claim 19, wherein:
the electrical circuit includes at least a heat-generating component that generates heat when being operated; and
the heat-generating component contacts the outer wall surface to improve heat transfer from the heat-generating component to the cylindrical outer wall surface.

* * * * *